United States Patent
Arai et al.

(10) Patent No.: US 7,038,133 B2
(45) Date of Patent: May 2, 2006

(54) WIRE HARNESS PROTECTOR

(75) Inventors: Hiroaki Arai, Shizuoka (JP); Aiko Okamoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/095,474

(22) Filed: Apr. 1, 2005

(65) Prior Publication Data

US 2005/0217888 A1  Oct. 6, 2005

(30) Foreign Application Priority Data

Apr. 2, 2004  (JP) ............................. 2004-109593

(51) Int. Cl.
*H02G 3/04*  (2006.01)

(52) U.S. Cl. ..................... 174/72 A; 174/68.3; 174/96; 174/97; 174/99 R; 138/115; 138/173

(58) Field of Classification Search .................. 174/48, 174/68.1, 68.3, 70 C, 72 A, 73.1, 95–99 R, 174/100, 101; 138/108, 115, 116, 117, 157, 138/162, 173; 248/49, 68.1, 73
See application file for complete search history.

(56) References Cited

U.S. PATENT DOCUMENTS

| | | | | |
|---|---|---|---|---|
| 3,233,851 A | * | 2/1966 | Lemieux et al. | ............ 248/68.1 |
| 3,312,251 A | * | 4/1967 | Marks et al. | ................ 138/158 |
| 3,403,220 A | * | 9/1968 | Anton et al. | ................. 174/101 |
| 3,432,128 A | * | 3/1969 | Elleboudt | ................... 248/68.1 |
| 3,636,984 A | * | 1/1972 | Rauhauser | ................... 138/155 |
| 3,697,667 A | * | 10/1972 | Pollak et al. | ............... 174/68.3 |
| 4,156,795 A | * | 5/1979 | Lacan | .......................... 174/97 |
| 4,398,564 A | * | 8/1983 | Young et al. | ................ 174/101 |
| 4,864,082 A | * | 9/1989 | Ono et al. | ....................... 174/97 |
| 4,951,716 A | * | 8/1990 | Tsunoda et al. | ............. 138/162 |
| 4,990,722 A | * | 2/1991 | Benito Navazo | ............ 174/97 |
| 5,063,473 A | * | 11/1991 | Hall et al. | .................. 174/68.3 |
| 5,401,905 A | * | 3/1995 | Lesser et al. | ............. 174/99 R |
| 5,534,665 A | * | 7/1996 | Long | ......................... 174/72 A |
| 5,535,969 A | * | 7/1996 | Duffy, Jr. | .................... 248/68.1 |
| 5,597,980 A | * | 1/1997 | Weber | ....................... 174/72 A |
| 5,613,655 A | * | 3/1997 | Marion | ........................ 248/68.1 |
| 5,709,249 A | * | 1/1998 | Okada et al. | ................ 138/162 |
| 6,528,728 B1 | * | 3/2003 | Shima | .......................... 174/101 |
| 6,861,589 B1 | * | 3/2005 | Katsumata et al. | ........ 174/68.3 |

FOREIGN PATENT DOCUMENTS

| | | |
|---|---|---|
| JP | 2001-359217 | 12/2001 |
| JP | 2002-225648 | 8/2002 |

* cited by examiner

*Primary Examiner*—Dean A. Reichard
*Assistant Examiner*—Adolfo Nino
(74) *Attorney, Agent, or Firm*—Finnegan, Henderson, Farabow, Garrett & Dunner, L.L.P.

(57) ABSTRACT

In a wire harness protector comprised of a gutter-like protector main body with a bottom wall and both side walls, for accommodating corrugated tubes 9, into which a wire harness is inserted, in multi tiers in the vertical direction and a cover for covering an opening between upper ends of the both side walls of the protector main body, a wire holding spacer for positioning and holding the corrugate tube located in a lower tier within the protector main body, the wire holding spacer is formed integrally with one side wall of the both side walls of the protector main body through a hinge portion, and at position opposed to the other side wall of the both side walls of the wire holding spacer, a locking portion for engaging/releasing with/from an engaging portion of the other side wall is formed.

8 Claims, 4 Drawing Sheets

WIRE HARNESS PROTECTOR

BACKGROUND OF THE INVENTION

1. Field of the Invention

The present invention relates to a wire harness protector for accommodating and protecting a plurality of wire harnesses for vehicles, for example.

2. Description of the Related Art

Conventional type of wire harness protector is disclosed in patent brochures, Japanese Patent Applications Laid-Open No. 2001-359217 and Laid-Open No. 2002-225648.

The conventional wire harness protector 1 (shown in FIG. 1 and FIG. 2) is comprised of a gutter-like protector main body 2 of synthetic resin for accommodating a corrugated tube 9, into which a wire harness 8 is inserted, and a cover 3 for covering both side walls 2a, 2a' of the protector main body 2.

An upper tier between the both side walls 2a, 2a' of the protector main body 2 constitutes an upper tier accommodating portion 4 for accommodating two corrugated tubes 9, 9 and a lower tier constitutes a lower tier accommodating portion 5 for accommodating one corrugated tube 9.

At the lower tier between the side walls 2a, 2a' of the protector main body 2, a spacer 7 for dividing the upper tier accommodating portion 4 from the lower tier accommodating portion 5 may be detachably attached. That is, the spacer 7 is attached/detached by engaging/releasing a pair of locking portions 6, 6 formed so as to protrude from an inner wall of the lower tier accommodating portion 5 of the protector main body 2 with/from locking holes 7b of a pair of flange portion 7a, 7a which drop from the both sides of the spacer 7. By use of the spacer 7, one corrugated tube 9 can be positioned and held in the lower tier accommodating portion 5 of the protector main body 2 without moving.

On the bottom face of the upper tier accommodating portion 4, the bottom face of the lower tier accommodating portion 5 of the protector main body 2, the inner face of the cover 3, and front and back faces of the end part of the spacer 7, tube locking ribs 2c, 3c and 7c which are locked into an annular recess 9a of the corrugate tube 9 having irregularity on its surface are provided in a protruding condition.

With the above-mentioned conventional wire harness protector 1, however, when the corrugated tubes 9, into which the wire harness 8 is inserted, are piled in multi tiers and accommodated within the protector main body 2 through the spacer 7, the pair of locking holes 7b, 7b on the both sides of the spacer 7 each need to be engaged with the pair of locking portions 6, 6 on the opposed inner faces of the protector main body 2. For this reason, attachment operation of the spacer 7 becomes complicated and wiring of the wire harness 8 in multi tiers of piling and arranging the wire harness 8 covered with the corrugate tube 9 within the protector main body 2 requires a lot of time.

SUMMARY OF THE INVENTION

The present invention has been achieved with such points in mind.

It therefore is an object of the present invention to provide a wire harness protector capable of achieving wiring of the wire harness in multi tier stably and easily.

To achieve the object, according to a first aspect of the present invention, there is provided a wire harness protector, comprising: a gutter-like protector main body with a bottom wall and both side walls for accommodating a wire harness in multi tiers in the vertical direction; a cover for covering an opening between upper ends of the both side walls of the protector main body; and a wire holding spacer for positioning and holding the wire harness located in a lower tier within the protector main body, wherein the wire holding spacer is formed integrally with one side wall of the both side walls of the protector main body through a hinge portion; and wherein, at position opposed to the other side wall of the both side walls of the protector main body, a locking portion for engaging/releasing with/from an engaging portion of the other side wall is formed.

As has been described, according to the first aspect of the present invention, by the simple operation of closing the wire holding spacer through the hinge portion formed integrally with one side wall of the both side walls of the protector main body, thereby to engage the locking portion of the wire holding spacer with the engaging portion of the other side wall of the protector main body, the wire harness located in the lower tier can be positioned and held in the protector main body. Accordingly, wiring of the wire harness in multi tiers can be achieved stably and easily.

According to a second aspect of the present invention, as it depends from the first aspect, there is provided a wire harness protector, wherein on the bottom wall of the protector main body, there is formed at least one partition wall serving as a partition when a plurality of the wire harness are accommodated in parallel in the horizontal direction; wherein notched portions for accommodating the wire holding spacer are formed on the partition wall and the both side walls of the protector main body; and wherein the wire holding spacer is swungably supported openably/closably at the lower edge of the notched portion of the one side wall through the hinge portion.

According to the second aspect of the present invention, since the partition wall is formed on the bottom wall of the protector main body, the notched portions for accommodating the wire holding spacer are formed on this partition wall and the both side walls of the protector main body and the wire holding spacer is supported freely openably/closably at the lower edge of the notched portion of one side wall through the hinge portion, the wire holding spacer can be accommodated in the notched portion on the both side walls and the partition wall of the protector main body and further, more wire harnesses can be easily positioned and wired in multi tiers through the partition wall and the wire holding spacer in the vertical and horizontal directions.

According to a third aspect of the present invention, there is provided a wire harness protector, comprising: a gutter-like protector main body with a bottom wall and both side walls for accommodating corrugate tubes inserted with a wire harness in multi tiers in the vertical direction; a cover for covering an opening between upper ends of the both side walls of the protector main body; and a wire holding spacer for positioning and holding the corrugated tube located in a lower tier within the protector main body, wherein the wire holding spacer is formed integrally with one side wall of the both side walls of the protector main body through a hinge portion; and wherein at position opposed to the other side wall of the both side walls of the protector main body, a locking portion for engaging/releasing with/from an engaging portion of the other side wall is formed.

According to the third aspect of the present invention, by the simple operation of closing the wire holding spacer through the hinge portion formed integrally with one side wall of the both side walls of the protector main body, thereby to engage the locking portion of the wire holding spacer with the engaging portion of the other side wall of the protector main body, the corrugated tube, into which the wire harness is inserted, located in the lower tier can be positioned and held in the protector main body. Accordingly, wiring of the corrugated tube, into which the wire harness is inserted, in multi tiers can be achieved stably and easily.

According to a fourth aspect of the present invention, as it depends from the third aspect, there is provided a wire harness protector, wherein on the bottom wall of the protector main body, there is formed at least one partition wall which serves as a partition when a plurality of the corrugate tubes are accommodated in parallel in the horizontal direction; wherein notched portions for accommodating the wire holding spacer are formed on the partition wall and the both side walls of the protector main body; and wherein the wire holding spacer is swungably supported openably/closably at the lower edge of the notched portion of the one side wall through the hinge portion.

According to the fourth aspect of the present invention, since the partition wall is formed on the bottom wall of the protector main body, the notched portions for accommodating the wire holding spacer are formed on this partition wall and the both side walls of the protector main body and the wire holding spacer is supported freely openably/closably at the lower edge of the notched portion of one side wall through the hinge portion, the wire holding spacer can be accommodated in the notched portion on the both side walls and the partition wall of the protector main body and further, more corrugated tubes, into which the wire harnesses is inserted, can be easily positioned and wired in multi tiers through the partition wall and the wire holding spacer in the vertical and horizontal directions.

BRIEF DESCRIPTION OF THE ACCOMPANYING DRAWINGS

DETAILED DESCRIPTION OF THE PREFERRED EMBODIMENTS

Figure 1:
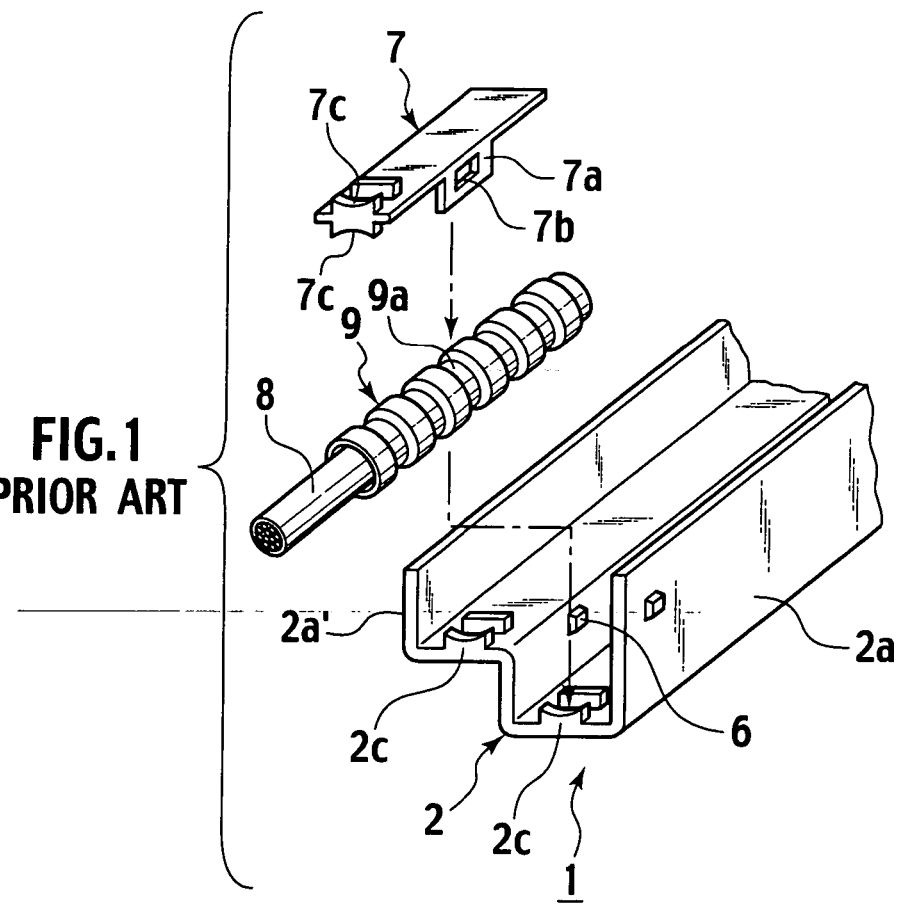
FIG. 1 is a perspective view of a conventional wire harness protector prior to assembling.
Figure 2:
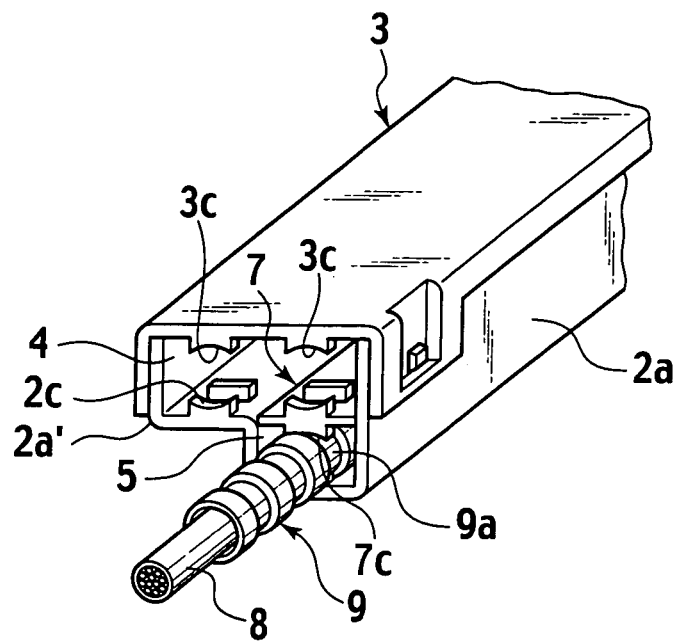
FIG. 2 is a perspective view of the conventional wire harness protector.

There will be detailed below the preferred embodiments of the present invention with reference to the accompanying drawings. Like members are designated by like reference characters.

Figure 3:
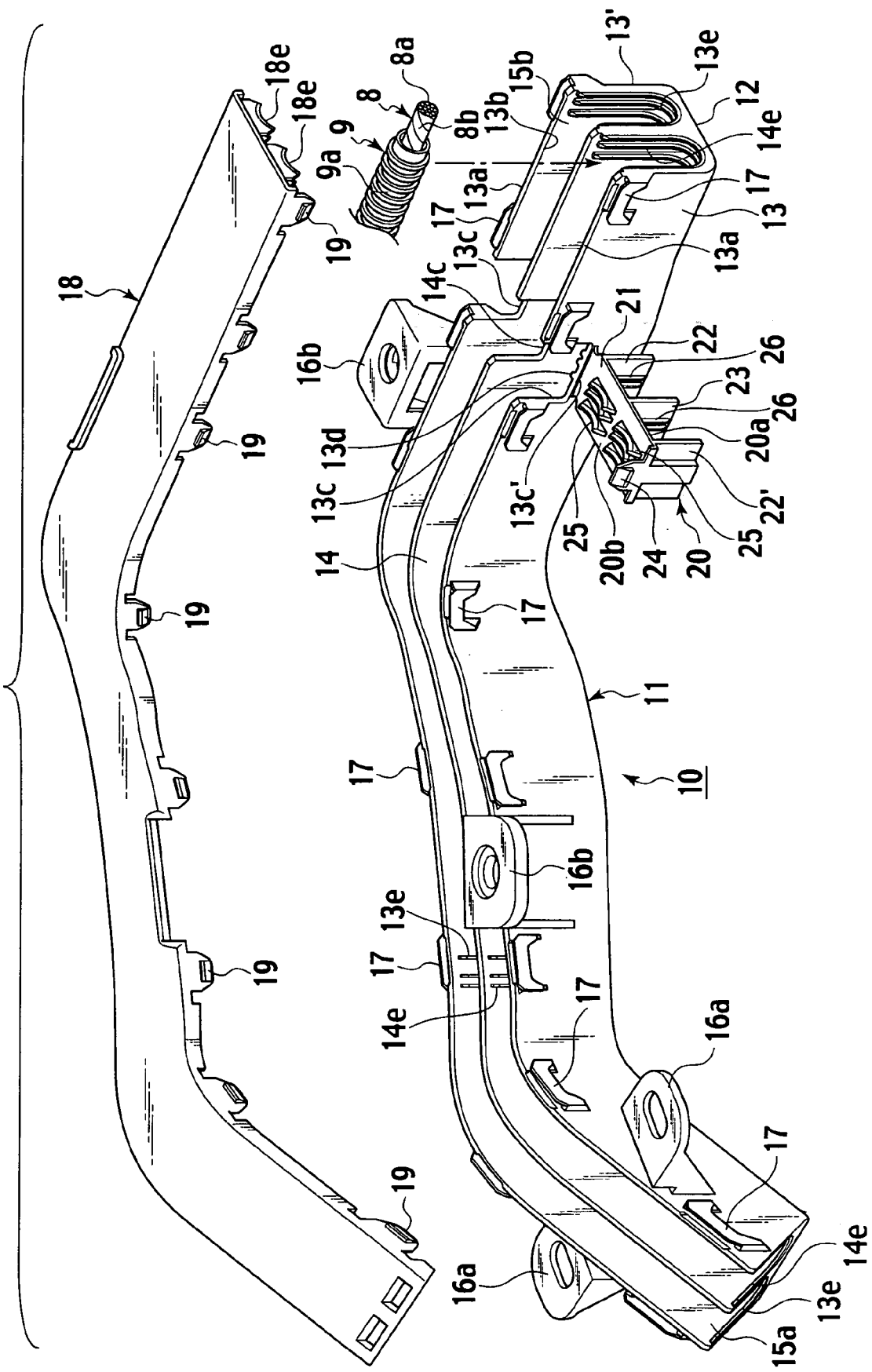
FIG. 3 is a perspective view showing the state where a cover of a wire harness protector of an embodiment according to the present invention is not closed.

FIG. 3 is a perspective view showing the state where a cover of a wire harness protector of and embodiment according to the present invention is not closed and FIG. 4a is front view showing the state where the cover is closed.

Figure 4:
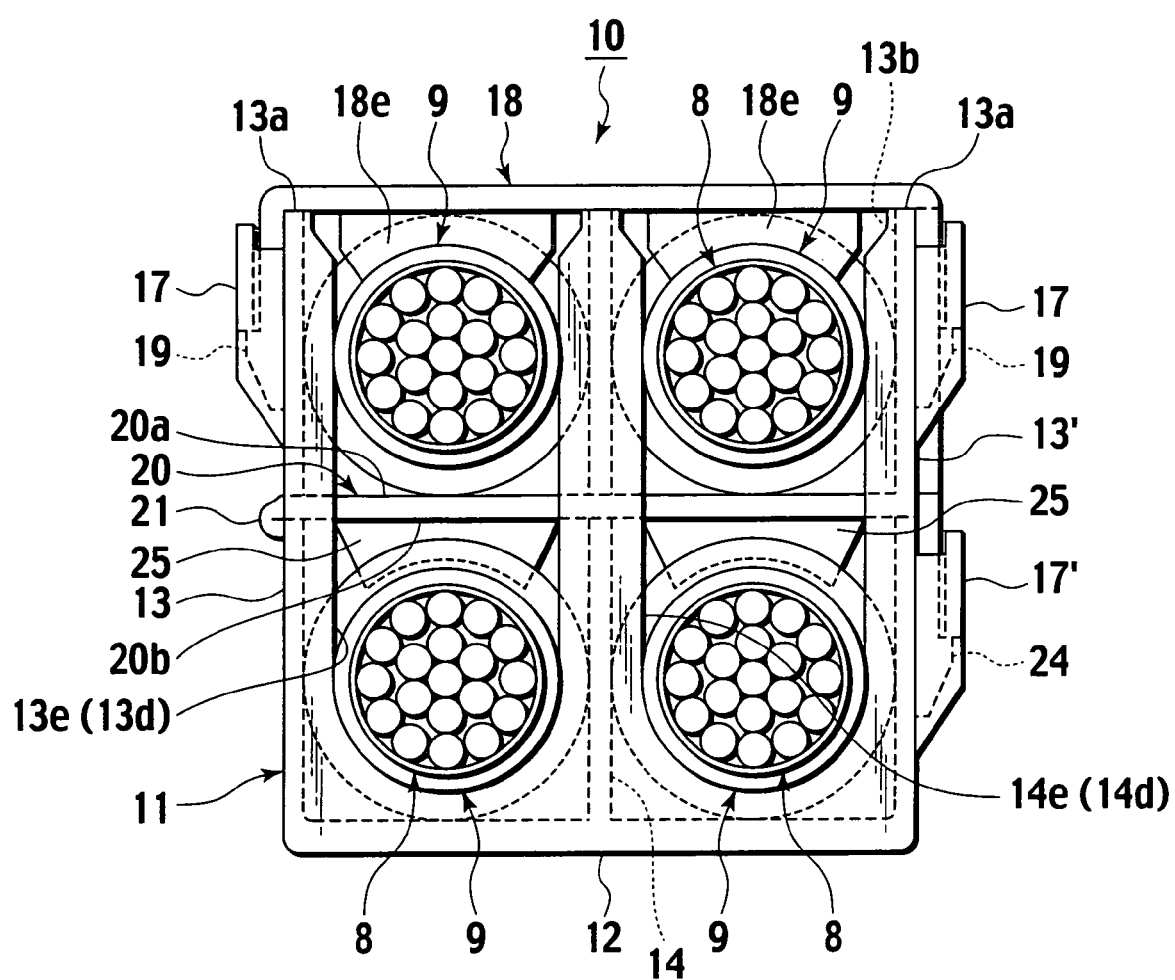
FIG. 4a is front view showing the state where the cover is closed.

As shown in FIG. 3 and FIG. 4, a wire harness protector 10 is comprised protector main body 11 of synthetic resin, which is formed of a bottom wall 12 and both side walls 13, 13' which rise upwards from both ends of the bottom wall 12 in the shape of a gutter (in the shape of the square bracket "]" in cross section), the protector main body 11 accommodating corrugated tubes, into which a wire harness is inserted, so as to be piled in two tiers (multi tiers) in the vertical direction as well as to be placed in parallel in two rows in the horizontal direction via a partition wall 14, and a cover 18 of synthetic resin for opening/closing an opening 13b between upper ends 13a, 13a of the both side walls 13, 13' of the protector main body 11.

As shown in FIG. 3, the bottom wall 12 leading up to a wire lead-out port 15a at one end (left end in FIG. 3) of the protector main body 11 is formed so as to be inclined downwards and the bottom wall 12 leading up to a wire lead-out port 15b at the other end (right end in FIG. 3) of the protector main body 11 is formed so as to bend in the shape of character L. In the center between the both side walls 13, 13' of the bottom wall 12, the partition wall 14 having the same height as the side walls 13, 13' is integrally formed with the bottom wall so as to protrude upwards. When the corrugated tube 9 to which the wire harness is inserted is accommodated in the protector main body 11, the partition wall 14 serves as a partition for arranging the corrugated tubes 9 in parallel in two rows (multiple rows) in the horizontal direction. Further, at outer faces of the both side walls 13, 13' of the protector main body 11, two pairs of brackets for attachment to a vehicle body and the like 16a, 16a and 16b, 16b each of which is provided integrally with the side walls 13, 13' in a protruding condition.

As shown in FIG. 3 and FIG. 4, a cover 18 is formed in the shape of the character C in cross section so as to cover the side walls 13, 13' of the protector main body 11 and at both sides of the cover 18, locking nails (locking portions) 19 each having a hook-shaped tip are formed at regular intervals and integrally with the cover 18 in a protruding condition. At positions opposed to the locking nails 19 on the outer faces of the side walls 13, 13' of the protector main body 11, engaging portions 17 substantially shaped like a rectangular tube (frame) for locking/releasing of the locking nails 19 each of which is formed integrally with the side walls 13, 13' in a protruding condition. These engaging portions 17 and the locking nails 19 constitute a locking means for locking a closed state between the both side walls 13, 13' of the protector main body 11 and the cover 18.

Rectangular notched portions 13c and 14c are formed at positions close to the wire lead-out port 15b of the side walls 13, 13' and the partition wall 14 of the protector main body 11. On a lower edge 13c' of the notched portion 13c of one side wall 13 of the protector main body 11, a wire holding spacer 20 is formed integrally with the lower edge 13c' in a protruding condition via a thin hinge portion 21.

The wire holding spacer 20 is supported freely openably/closably through the thin hinge portion 21 and locates and holds the corrugated tube 9 located in the lower tier within the protector main body 11 between the bottom wall 12 of the protector main body 11. That is, on both sides of a surface 20a of the wire holding spacer 20, both side walls 22, 22' are integrally formed in a protruding condition, and at the center thereof, a partition wall 23 that serves as a partition when two corrugated tubes 9 are accommodated in parallel in the horizontal direction is integrally formed in a protruding condition.

At a lower end of the other side wall 22' of the wire holding spacer 20, a locking nail (locking portion) 24 having a hook-shaped tip is integrally formed so as to extend downwards. At a position opposed to the locking nail 24 on the lower side of the notched portion 13c of the other side wall 13' of the protector main body 11, an engaging portion 17' substantially shaped like a rectangular tube (frame) for locking/releasing of the locking nail 24 is integrally formed in a protruding condition. These engaging portion 17' and the locking nail 24 constitute a locking means for locking a closed state the wire holding spacer 20 is fallen down in the notched portions 13c and 14c of the side walls 13, 13' and the partition wall 14 of the protector main body 11. At this time, the wire holding spacer 20 is accommodated in the notched portions 13c and 14c of the side walls 13, 13' and the partition wall 14 of the protector main body 11, and the both side walls 22, 22' and the partition wall 23 of the wire holding spacer 20 is located at the same level as the side walls 13, 13' and the partition wall 14 of the protector main body 11.

Further, on the back side of the wire holding spacer 20, a plurality of tube locking ribs (tube locking portions) 25 which are locked into an annular recess 9a having irregularity on its surface of each corrugated tube 9 located in the lower tier are integrally formed in a protruding condition. At positions opposed to the tube locking ribs 25 on the opposed faces of the side walls 13, 13' and the partition wall 14 of the protector main body 11, the tube locking ribs (tube locking portions) 13d, 14d which are locked into the annular recess 9a having irregularity on its surface of each corrugated tube 9 located in the lower tier each of which is integrally formed in a protruding condition. Furthermore, on the opposed faces of the side walls 22, 22' and the partition wall 23 of the surface 20a of the wire holding spacer 20, tube locking ribs (tube locking portions) 26 which are locked into the annular recess 9a having irregularity on its surface of each corrugated tube 9 located in the lower tier each of which is integrally formed in a protruding condition.

At the sides of the middle part and the wire lead-out ports 15a, 15b of the bottom wall 12, the side walls 13, 13' and the partition wall 14, U-shaped tube locking ribs (tube locking portions) 13e, 14e which are locked into the annular recess 9a having irregularity on its surface of each of the corrugated tubes 9 located in the upper and lower tiers each of which is integrally formed in a protruding condition. At positions opposed to the tube locking ribs 13e, 14e on the back side of the cover 18, tube locking ribs (tube locking portions) 18e which are locked into the annular recess 9a having irregularity on its surface of each corrugated tube 9 located in the upper tier each of which is integrally formed in a protruding condition. A wire harness covered with the corrugated tube 9 is configured by bundling a plurality of electric wires 8a with a binding tape 8b.

With the wire harness protector 10 of this embodiment, before wiring the corrugated tube 9, into which the wire harness 8 is inserted, between the side wall 13 and the partition wall 14, and the side wall 13' and the partition wall 14 in multiple tiers in the vertical and horizontal directions, as shown in FIG. 3, the wire holding spacer 20 is kept to be lowered toward outside of one side wall 13 (that is, the notched portions 13c and 14c of the side walls 13, 13' and the partition wall 14 are opened). In this state, the pair of corrugated tubes 9, 9, into which the wire harness 8 is inserted, are inserted into the side of the lower tier (the side of the bottom wall 12) between the side wall 13 and the partition wall 14, and the side wall 13' and the partition wall 14 as shown by an arrow in FIG. 3.

Next, when the wire holding spacer 20 is closed so as to be accommodated in the notched portions 13c and 14c of the side walls 13, 13' and the partition wall 14 of the protector main body 11 and the locking nail 24 engages with the engaging portion 17', the tube locking ribs 25 on the back side 20b of the wire holding spacer 20 and the tube locking ribs 13d, 14d of the opposed faces of the side walls 13, 13' and the partition wall 14 are locked into the annular recess 9a having irregularity on its surface of each corrugated tube 9 located in the lower tier. As a result, each corrugated tube 9 located in the lower tier is positioned without moving and fixed on a predetermined position in the protector main body 11. At this time, the annular recesses 9a at the middle and both end of the each corrugated tube 9 are locked by the tube locking ribs 13e, 14e on the opposed inner faces of the side walls 13, 13' and the partition wall 14 and the U-shaped tube locking ribs 13e, 14e at the wire lead-out ports 15a, 15b of the protector main body 11.

In this state, when the pair of corrugated tubes 9, 9, into which the wire harness 8 is inserted, are inserted into the side of the upper tier (the side of the surface 20a of the wire holding spacer 20) between the side wall 13 and the partition wall 14, and the side wall 13' and the partition wall 14 and wired, and the opening 13b of the protector main body 11 is covered with the cover 18 by engaging each locking nails 19 of the cover 18 with each engaging portion 17 on the side walls 13, 13' of the protector main body 11, the annular recess 9a of each corrugated tube 9 located in the upper tier on the wire holding spacer 20 is locked by the tube locking ribs 26 on the opposed inner faces of the side walls 22, 22' and the partition wall 23 of the wire holding spacer 20. Further, the annular recesses 9a at the middle and both end of the each corrugated tube 9 are locked by the tube locking ribs 13e, 14e on the opposed inner faces of the side walls 13, 13' and the partition wall 14, the U-shaped tube locking ribs 13e, 14e at the wire lead-out ports 15a, 15b, and the tube locking rib 18e on the back side of the cover 18.

As described above, by the simple operation of closing the wire holding spacer 20 through the thin hinge portion 21 formed integrally with one side wall 13 of the side walls 13, 13' of the protector main body 11, thereby to engage the locking nail of the wire holding spacer 20 with the engaging portion 17' of the other side wall 13' of the protector main body 11, the corrugated tube 9 located in the lower tier, into which the wire harness 8 is inserted, can be positioned in the protector main body 11 and held stably and easily. This enables stable and simple wiring of the corrugated tube 9, into which the wire harness 8 is inserted, in multiple tier.

Further, since the partition wall 14 is integrally formed at the center of the bottom wall 12 of the protector main body 11 in a protruding condition, the notched portions 13c, 14c for accommodating the wire holding spacer 20 are formed on the partition wall 14 and the both side walls 13, 13' of the protector main body 11, and the wire holding spacer 20 is supported by the lower edge 13c of the notched portion 13c of one side wall 13 freely openably/closably through the thin hinge portion 21, the wire holding spacer 20 can be accommodated in the notched portions 13c, 14c of the side walls 13, 13' and the partition wall 14 of the protector main body 11. In addition, four corrugated tubes 9, into which the wire harness 8 is inserted, can be stably and easily positioned and wired in two tiers and two rows in the vertical and horizontal directions through the partition wall 14 of the protector main body 11 and the partition wall 23 of the wire holding spacer 20.

Figure 5:
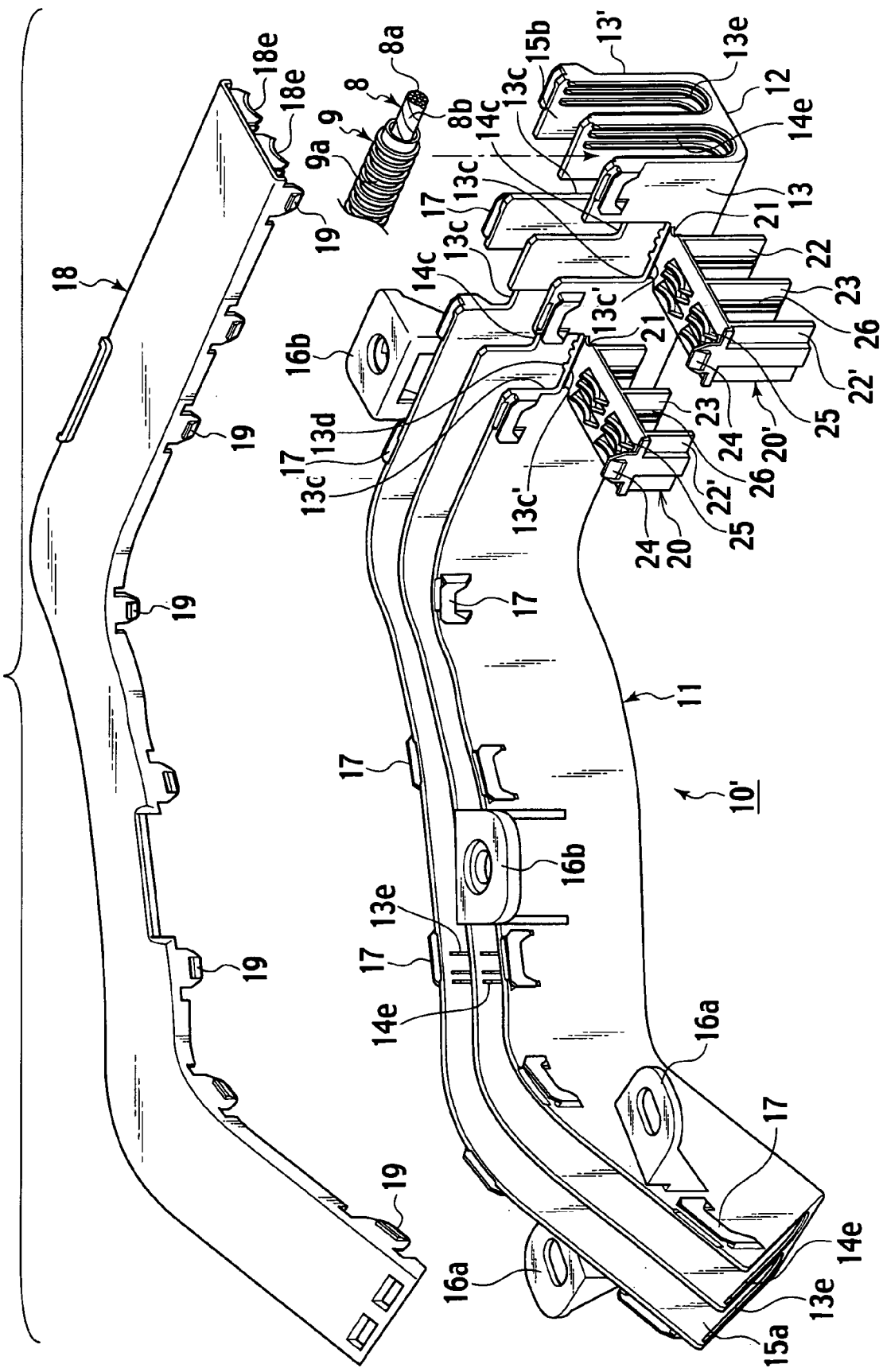
FIG. 5 is a perspective view showing the state where a cover of a wire harness protector of another embodiment according to the present invention is not closed.

FIG. 5 is a perspective view showing the state where a cover of a wire harness protector of another embodiment according to the present invention is not closed.

As shown in FIG. 5, the wire harness protector 10' accommodates the corrugated tubes 9, into which the wire harness 8 is inserted, so that they are piled in three tiers (multi tiers) within the protector main body 11 formed of the bottom wall 12 and the side walls 13, 13' which rise upwards from the both ends of the bottom wall 12 in the shape of a gutter (in the shape of the square bracket "]" in cross section). Long and short notched portion 13c, 14c are formed at positions close to the wire lead-out port 15b on the both side walls 13, 13' and the partition wall 14 of the protector main body 11. At the lower edge 13c' of the short notched portion 13c on one side wall 13 of the protector main body 11, the wire holding spacer 20 for holding the corrugated tube 9 located in the middle tier through the thin hinge portion 21 is integrally formed in a protruding condition, and at the lower edge 13c' of the long notched portion 13c on one side wall 13 of the protector main body 11, another wire holding spacer 20' for holding the corrugated tube 9 located in the bottom tier through the thin hinge portion 21 is integrally formed in a protruding condition. Since other configuration is similar to that of the former wire harness protector, the same reference numerals are given to the same components and detailed description thereof is not repeated here.

With this wire harness protector 10', since the partition wall 14 is integrally formed at the center of the bottom wall 12 of the protector main body 11 in a protruding condition, the long and short notched portions 13c, 14c for the wire holding spacer 20 are formed on the partition wall 14 and the side walls 13, 13' of the protector main body 11, and the wire holding spacers 20, 20' are supported freely openably/closably at the lower edge 13c' of each notched portion 13c of one side wall 13 through the thin hinge portion 21, the wire holding spacers 20, 20' can be accommodated in the notched portions 13c, 14c of the side walls 13, 13' and the partition wall 14 of the protector main body 11. In addition, six corrugated tubes 9, into which the wire harness 8 is inserted, can be stably and easily positioned and wired in three tiers and two rows in the vertical and horizontal directions through the partition wall 14 of the protector main body 11 and the partition walls 23 of the wire holding spacers 20, 20'.

In each of the above-mentioned embodiments, the corrugate tube, into which the wire harness is inserted, is held within the protector main body through the wire holding spacer. However, the wire harness may be directly held by the wire holding spacer.

The entire contents of Japanese Patent Application P2004-109593 (filed Apr. 2, 2004) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A wire harness protector, comprising:
   a gutter-like protector main body with a bottom wall, a first side wall, and a second side walls for accommodating a wire harness in multi tiers in the vertical direction;
   a cover for covering an opening between upper ends of the first and second side walls of the protector main body; and
   a wire holding spacer configured to locate and secure the wire harness within each tier of the protector main body,
   wherein the wire holding spacer is formed integrally with the first side wall of the protector main body through a hinge portion; and
   wherein, a locking portion disposed on the outside edges of the cover is configured to releasably engage a lock engaging portion disposed on an outer periphery of the first and second side walls of the protector main body.

2. A wire harness protector according to claim 1,
   wherein on the bottom wall of the protector main body, there is formed at least one partition wall substantially extending the longitudinal length of the protector main body and serving as a partition when a plurality of the wire harness are accommodated in parallel in the horizontal direction;
   wherein notched portions for accommodating the wire holding spacer are formed on the partition wall and the first and second side walls of the protector main body; and
   wherein the wire holding spacer is swungably supported openably/closably at the lower edge of the notched portion of the first side wall through the hinge portion.

3. A wire harness protector according to claim 1, wherein tube locking ribs for lockably engaging the wire harness are disposed proximate at least one longitudinal end of the protector main body.

4. A wire harness protector according to claim 1, wherein the wire holding spacer constitutes a portion of a side wall of the protector main body at an upper notched portion of the protector main body.

5. A wire harness protector, comprising:
   a gutter-like protector main body with a bottom wall, a first side wall, and a second side walls for accommodating corrugate tubes inserted with a wire harness in multi tiers in the vertical direction;
   a cover for covering an opening between upper ends of the first and second side walls of the protector main body; and
   a wire holding spacer configured to locate and secure the wire harness within each tier of the protector main body,
   wherein the wire holding spacer is formed integrally with the first side wall of the protector main body through a hinge portion; and
   wherein, a locking portion disposed on the outside edges of the cover is configured to releasably engage a lock engaging portion disposed on an outer periphery of the first and second side walls of the protector main body.

6. A wire harness protector according to claim 5,
   wherein on the bottom wall of the protector main body, there is formed at least one partition wall substantially extending the longitudinal length of the protector main body and which serves as a partition when a plurality of the corrugate tubes are accommodated in parallel in the horizontal direction;
   wherein notched portions for accommodating the wire holding spacer are formed on the partition wall and the first and second side walls of the protector main body; and
   wherein the wire holding spacer is swungably supported openably/closably at the lower edge of the notched portion of the first side wall through the hinge portion.

7. A wire harness protector according to claim 5, wherein tube locking ribs for lockably engaging the wire harness are disposed proximate at least one longitudinal end of the protector main body.

8. A wire harness protector according to claim 5, wherein the wire holding spacer constitutes a portion of a side wall of the protector main body at an upper notched portion of the protector main body.

* * * * *

UNITED STATES PATENT AND TRADEMARK OFFICE
CERTIFICATE OF CORRECTION

PATENT NO. : 7,038,133 B2 Page 1 of 1
APPLICATION NO. : 11/095474
DATED : May 2, 2006
INVENTOR(S) : Hiroaki Arai et al.

It is certified that error appears in the above-identified patent and that said Letters Patent is hereby corrected as shown below:

In claim 1, column 7, line 51, "walls" should read --wall--.

In claim 5, column 8, line 26, "walls" should read --wall--.

Signed and Sealed this

Sixth Day of February, 2007

JON W. DUDAS
*Director of the United States Patent and Trademark Office*